United States Patent [19]

Adams

[11] 4,221,016
[45] Sep. 9, 1980

[54] VALVE STEM CLEANER AND POSITIONER

[76] Inventor: Harold R. Adams, Rte. 1, St. Francisville, Ill. 62460

[21] Appl. No.: 46,468

[22] Filed: Jun. 7, 1979

[51] Int. Cl.³ .............................................. A46B 15/00
[52] U.S. Cl. .................................................. 15/256.5
[58] Field of Search .................. 15/256.5, 246, 104.04; 137/242; 29/81 G, 81 H; 308/36.5

[56] References Cited

U.S. PATENT DOCUMENTS

| | | | |
|---|---|---|---|
| 2,580,170 | 12/1951 | Grimmer | 15/256.5 X |
| 3,527,611 | 9/1970 | Newfarmer | 15/104.04 X |
| 4,061,157 | 12/1977 | Hanssen | 15/256.5 X |

Primary Examiner—Edward L. Roberts
Attorney, Agent, or Firm—Glenn K. Robbins

[57] ABSTRACT

A valve stem cleaner and positioner for threaded valve stems. The cleaner and positioner is designed for use with threaded valve stems in which the portion of the valve stem to be cleaned is inaccessible from the ends of the stem as for example, in an open yoke of a valve and also for use in valve stems where an end is accessible as above the valve hand wheel. For the inaccessible portion of the valve stem the cleaner and positioner is made in hinged half portions with semi-circular members which are adapted to be fitted around the valve stem and hinged together. The cleaner and positioner has inwardly extending wire bristles which engage the threads of the valve stem and a nut portion so that when the cleaner and positioner is opened and fitted around the valve stem by means of closure means the cleaner and positioner can be closed about the valve stem. A wrench fitted on the nut can move the device about the threaded valve stem to any position as desired. In a modification where the threaded end of the valve stem is accessible, the cleaner and positioner may be made integral and simply threaded on top of the threaded valve stem and by means of the wrench fitting on the nut portion moved to a desired position on top of the hand wheel.

8 Claims, 8 Drawing Figures

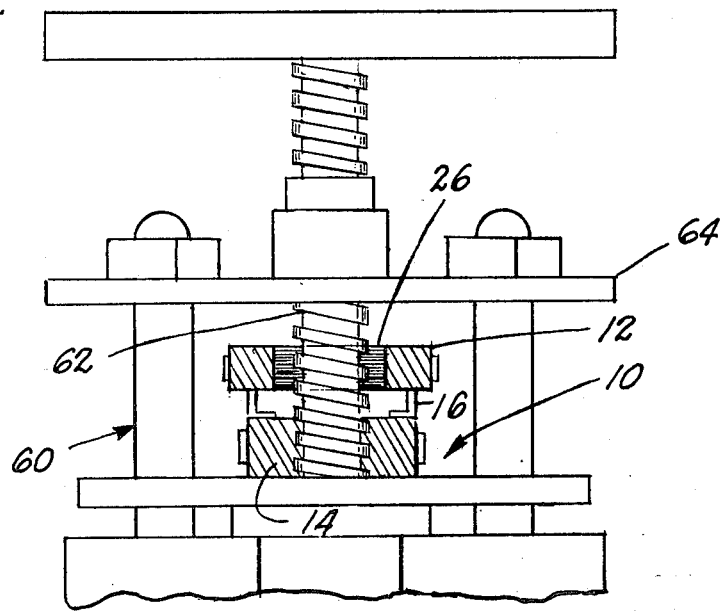
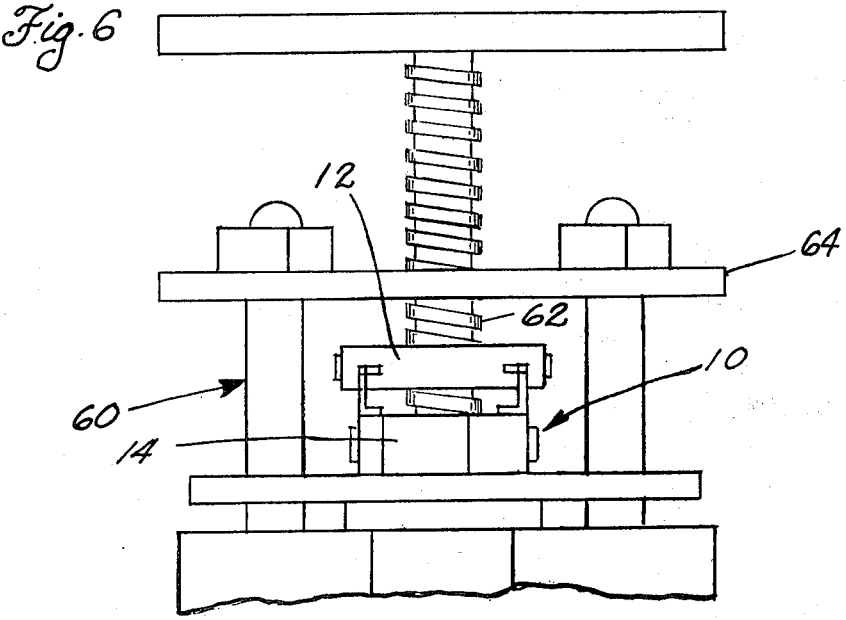

4,221,016

VALVE STEM CLEANER AND POSITIONER

SUMMARY OF THE INVENTION

Various types of valves have been conventionally used in the industrial applications of one type and another. Such valves used in the process industries, pertoleum industries, utilities and the like can be quite large and are quite often exposed to the atmosphere including harsh inclement weather and industrial pollution. Such valves having threaded valve stems are susceptible to corrosion and accumulation of debris and the like which impair the operation of the valve hand wheels and the threaded valve stem in their rotational movement. Such impairment of movement can destroy the operation and efficiency of the valve and render the industrial processing and piping inoperative.

By means of this invention there has been provide a threaded valve stem cleaner and nut positioner which can be used on various types of threaded valve stems. Through the connection of a nut to the cleaner which is comprised of inwardly extending radial wire bristles adapted to clean the threads of the valve stem, the cleaner can be moved by positioning a wrench on the nut and moving the combined cleaner and positioner as desired upon the valve stem. Such operation by means of a wrench can make possible the movement of the wire brush cleaner as desired about the threaded valve stem and clean debris therefrom.

The valve stem cleaner and nut positioner may in one embodiment be constructed in a hinged fashion with two semi-circular portions hinged together. The portions may be opened in jaw-like fashion and fitted around a threaded valve stem in an otherwise inaccessible portion within a yoke of the valve stem where the ends of the valve stem are not accessible. The hinged construction of the valve stem cleaner and nut positioner makes it possible to fit the cleaner and positioner about the inaccessible portion of the valve stem and by use of a wrench fitted about the nut move the device along the valve stem and positon it as desired.

In another embodiment the cleaner and positioner may be made integral where the threaded end of the valve stem is readily accessible. Where the threaded end of the valve stem is accessible, the integral nut and positioner may be simply threaded on the end of the valve stem and by means of a wrench position about the nut portion the cleaner and positioner may be moved to the top of the hand wheel as desired and clean debris from the valve stem.

The cleaner and positioner are simply constructed of conventional material such as brass, bronze, stainless steel, plastic or the like. The adaptability of of use in the field is such that the cleaner and positioner can be used in various types of jobs where the threaded valve stem is desired to be cleaned. The use in the field makes it possible to provide full maintainance and cleaning and avoidance of the accumulation of debris, corrosion or rust which might otherwise impair the operation of the valve.

The above features are objects of this invention and further objects will appear in the detailed description which follows and will be otherwise apparent to those skilled in the art.

For the purpose of illustration of this invention there is shown in the accompanying drawings preferred embodiments thereof. It is to be understood that these drawings are for the purpose of example only and that the invention is not limited thereto.

IN THE DRAWINGS

FIG. 5, is a fragmentary view in elevation of the hinged cleaner and positioner partly in section on a rising wheel gate valve.

FIG. 6, is a view similar to FIG. 5, but showing the hinged cleaner and positioner in full elevation.

DESCRIPTION OF THE INVENTION

Figure 1:
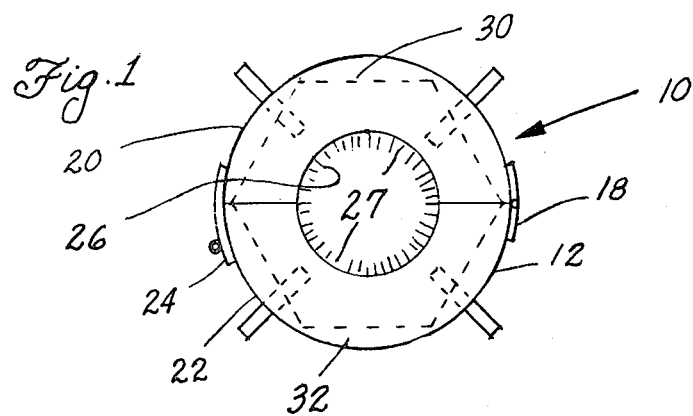
FIG. 1, is a top plan view of the cleaner and nut positioner in hinged form.

The cleaner and positioner of this invention is generally indicated by the reference numeral 10 in FIGS. 1, 2, 5 and 6. In this embodiment the cleaner and positioner is shown in hinged form to be placed about an otherwise inaccessible portion of valve stem where the ends are not exposed. The cleaner and positioner is formed of a cleaner housing or body 12 and a positioning nut 14 which are connected together by bracket members or supports 16. The cleaner 12 is comprised of a housing generally circular in form which is hinged at hinge 18 so that two halves 20 and 22 of the cleaner may be closed together. A fastener 24 is employed to hold the two half members together. Internal wire bristles 26 are provided and extend radially inwardly a sufficient distance so as to leave a central opening which is slightly smaller in diameter than the threads of the valve stem to be cleaned. A pair of gaps 27 are provided in the wire bristles to provide a space for fallout of debris.

A positioning nut 14 is constructed of two halves in a similar fashion to the cleaner housing. A hinge and fastening structure is employed to close the two halves 30 and 32 of the nut positioner together. It will be understood the hinging and fastening structure is similar to that described above for the cleaner housing.

Figure 2:
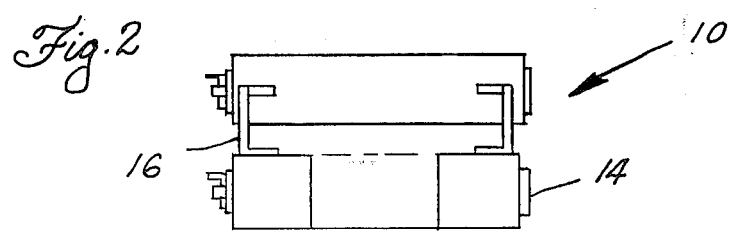
FIG. 2, is a view in front elevation of the hinged cleaner and positioner.
Figure 3:
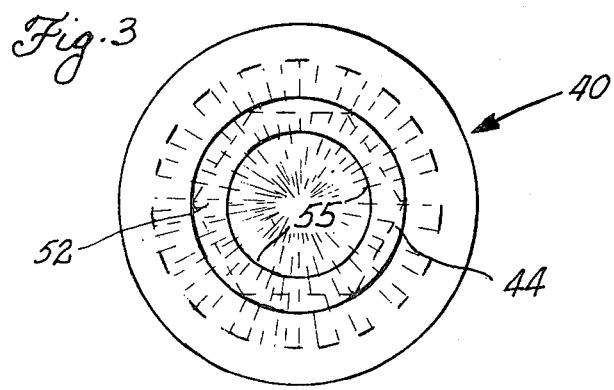
FIG. 3, is a top view of an integral modified cleaner and positioner.
Figure 4:
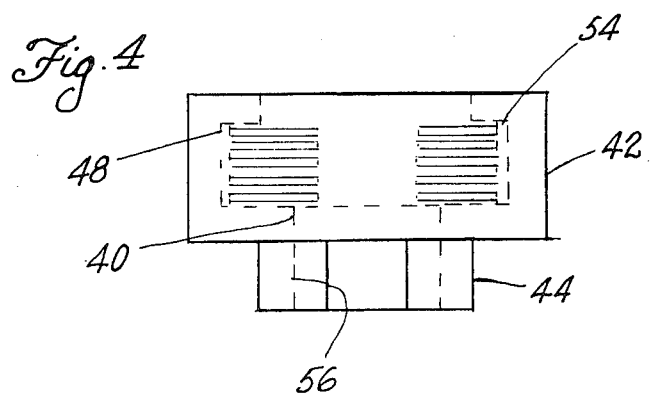
FIG. 4, is a view in front elevation of the modified cleaner and positioner.

A modified form of cleaner and nut positioner is employed in this invention shown in FIGS. 3 and 4, and generally identified by the reference numeral 40. The modification is integral in structure for use is non-rising valve wheels in which a threaded valve stem rises through the hand wheel and has an open end about which the modified cleaner and nut positioner may be threaded. The modified cleaner and positioner 40 is comprises of a generally cylindrical cleaner housing 42 from which depends a positioner 44. Thus nut positioner, like the positioner 14 of the embodiment 10 of FIGS. 1 and 2, is hexagonal or otherwise polygonal with an even number of sides in order that a conventional wrench may be placed upon it to move the cleaner and positioner about the threaded valve stem.

The cleaner housing 42 is of a larger diameter than the nut positioner and has an internal opening 46 which communicates with a recessed opening 48 comprising a raceway. A top opening 50 is provided so that the cleaner and positioner may be easily threaded upon the valve stem. A wire brush 52 connected to a rim 54 holding the bristles or the brush together and is fitted within the raceway 48. By this construction the wire brush member is held firmly in place with the bristles adapted to engage the threads of the valve stem for the necessary cleaning action. A pair of gaps 55 are provided in the wire bristles to provide a space for fallout of debris.

The nut positioner 44 is of conventional hexagonal configuration like the nut 14 of the hinged device 10 in order that it may be used to receive a standard wrench for moving the cleaner and positioner along the valve stem for cleaning action and positioning. Internal threads 56 are provided for the necessary threaded engagement on the threaded valve stem.

Use

The hinged valve stem cleaner and nut positioner 10 is readily adapted to be used with a conventional gate valve 60 shown in FIGS. 5 and 6, in which the valve hand wheel rises and the threaded portion of the valve stem 62 is confined within a yoke 64. This structure of the threaded valve stem within a yoke renders the threaded portion inaccessible from the end and the hinged cleaner and positioner 10 is very easily and simply used thereon. The two halves of the cleaner and positioner are first opened wide so that the jaws in essence are open. The cleaner position is then fitted around the valve stem 62 within the yoke. The fastener 24 is then closed to close the cleaner and positioner about the valve stem.

The hinged cleaner and positioner is then ready to be employed and positioned as desired or moved about the valve stem to clean debris therefrom by means of the wire brush 26 which engages the threads of the valve stem. A wrench is simply placed upon the hexagonal nut like positioner 14 and the cleaner and positioner is moved and rotated as desired. It will be understood that the cleaner and positioner may be moved into engagement with either the top or bottom supporting structure of the yoke as desired. The nut positioner makes this very simply effected by reception of a conventional wrench for the movement and rotation of the cleaner and positioner.

The integral cleaner and nut positioner 40 shown in FIGS. 3 and 4, is very simply adapted for use with a non-rising valve wheel in the valve generally indicated by the reference numeral 70. In this type of valve the valve hand wheel 72 is journalled upon the top of the yoke 74 and the threaded valve stem 76 is moved upwardly and downwardly in the operation of the valve by the manipulation of the hand wheel. In this embodiment since the top end of the threaded valve stem 76 is accessible, the integral cleaner and positioner 40 can simply be employed.

Figure 7:
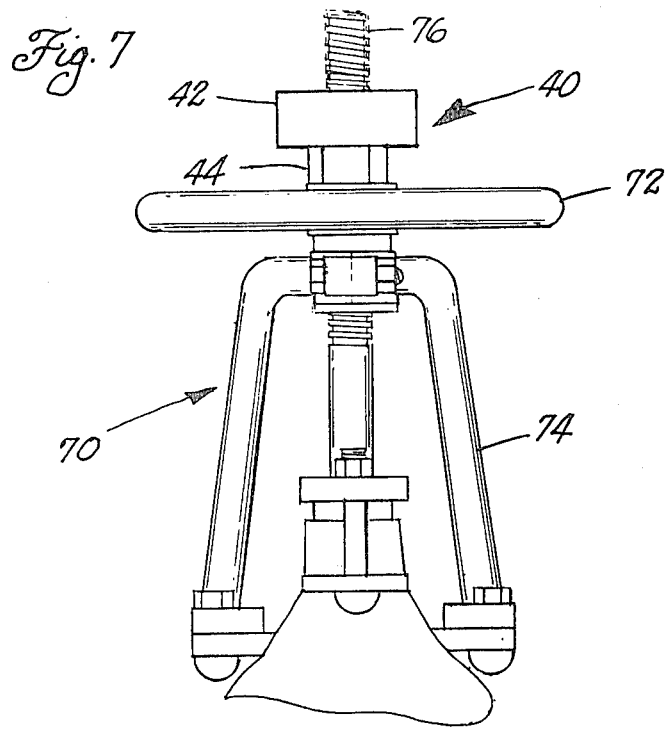
FIG. 7, is a fragmentary view in elevation of a non-rising wheel gate valve with a modified integral cleaner and positioner.
Figure 8:
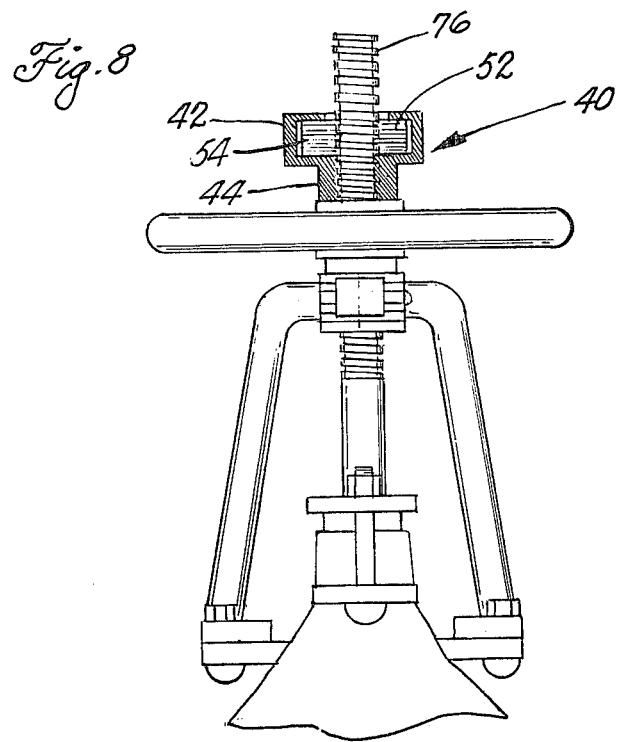
FIG. 8, is a view taken similarly to FIG. 7, but showing the modified cleaner and positioner in vertical section.

In use of the integral cleaner and positioner 40 shown in FIGS. 7 and 8, the cleaner and positioner is inserted on the top of the threaded valve stem and moved by the positioning of a wrench about the hexagonal positioner 44 to move it downwardly to any position as desired. Conventionally, the cleaner and positioner will be moved downwardly to engagement with the top portion of the valve hand wheel 72. Then the hand wheel is operated the threaded valve stem may be moved upwardly and downwardly within the cleaner and positioner 40 to clean the threads of the valve stem from debris and the like.

Various changes and modifications may be made within this invention as will be readily apparent to those skilled in the art. Such changes and modifications are within the scope and teaching of this invention as defined by the claims appended hereto.

What is claimed is:

1. A device for cleaning threaded valve stems on valves having a valve housing and means for positioning the device in selected axial positions on the threaded valve stem, said device comprising a ring-like brush holder having radially inwardly extending bristle elements and said positioning means comprising a member connected to said holder having internal threads engageable with the threads of the valve stem, said positioning means being adapted to be moved in threaded engagement with the valve stem and carry the brush holder with it to clean the threads of said valve stem.

2. The device of claim 1, in which said positioning means is in the form of an internally threaded nut-like member having polygonal sides for receiving a wrench or the like for turning said member on the threaded valve stem.

3. The device of claim 2, in which said holder is connected to the top of said nut-like member and is provided with an internal raceway receiving a rim-like element supporting said inwardly extending bristles.

4. The device of claim 5, in which said holder is integrally connected to said nut-like member and is comprised of a generally cylindrical housing having a substantially greater diameter than said nut-like member.

5. The device of claim 1, in which said holder and positioning means are provided with hinge means for opening and closing about the threaded valve stem where the threaded area of the valve stem to be cleaned is blocked at the boundaries of said area.

6. The device of claim 1, in which said positioning means is in the form of an internally threaded nut-like member having polygonal sides for receiving a wrench or the like for turning said member on the threaded valve stem and said holder and positioning means are provided with hinge means for opening and closing about the threaded valve stem where the threaded area of the valve stem to be cleaned is blocked at the boundaries of said area.

7. The device of claim 1, in which said nut-like member is spaced above said holder and is connected thereto by a plurality of circumferentially spaced support elements.

8. The device of claim 7, in which said holder and positioning means are provided with hinge means for opening and closing about the threaded valve stem where the threaded area of the valve stem to be cleaned is blocked at the boundaries of said area.

* * * * *